Oct. 23, 1945. R. S. HOAR 2,387,263
WHEELED SCRAPER
Filed July 11, 1941  5 Sheets—Sheet 3
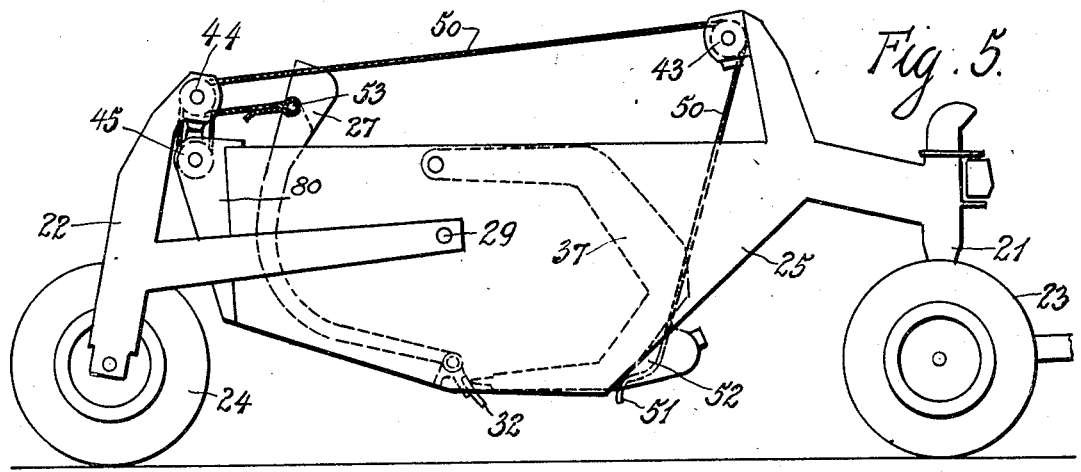
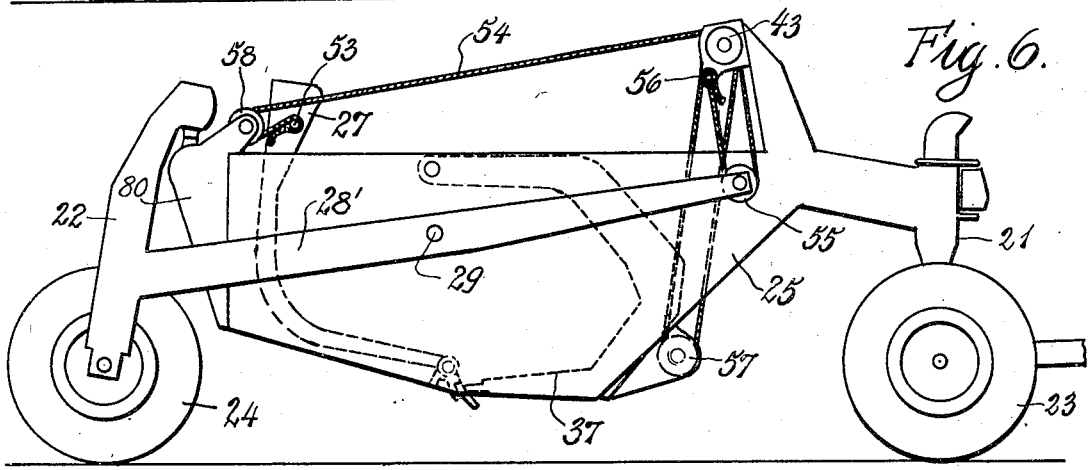
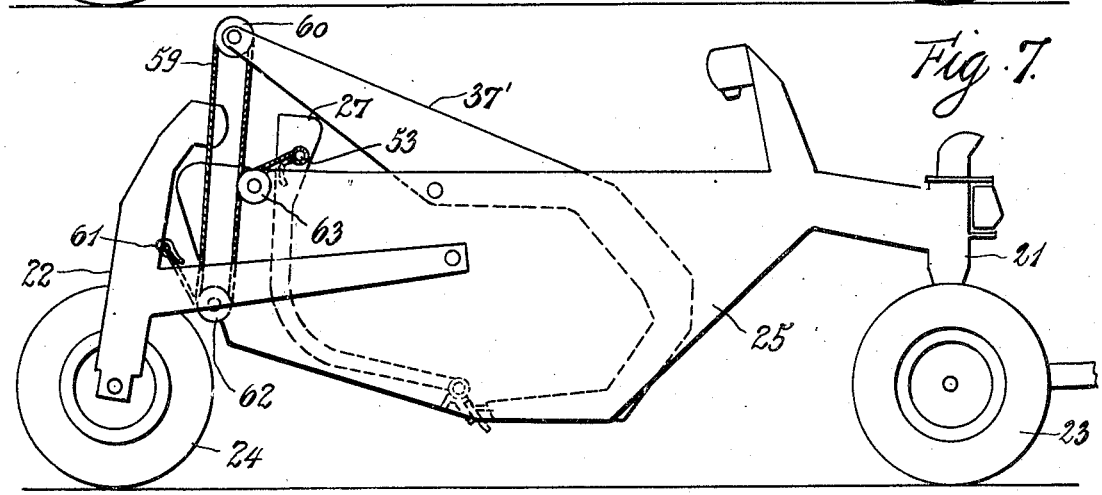
INVENTOR.
Roger Sherman Hoar.
BY Hoar & Ruhloff
ATTORNEYS

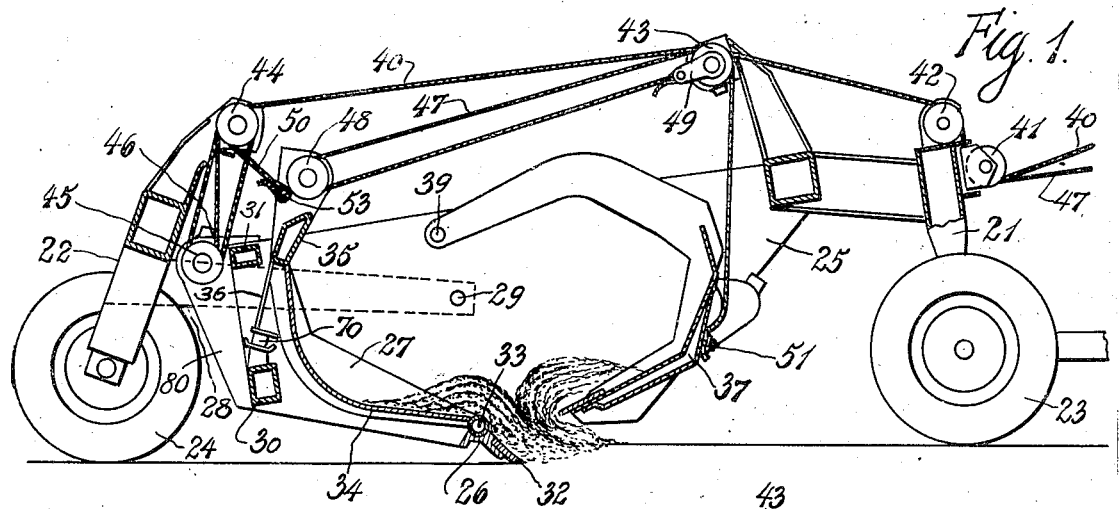
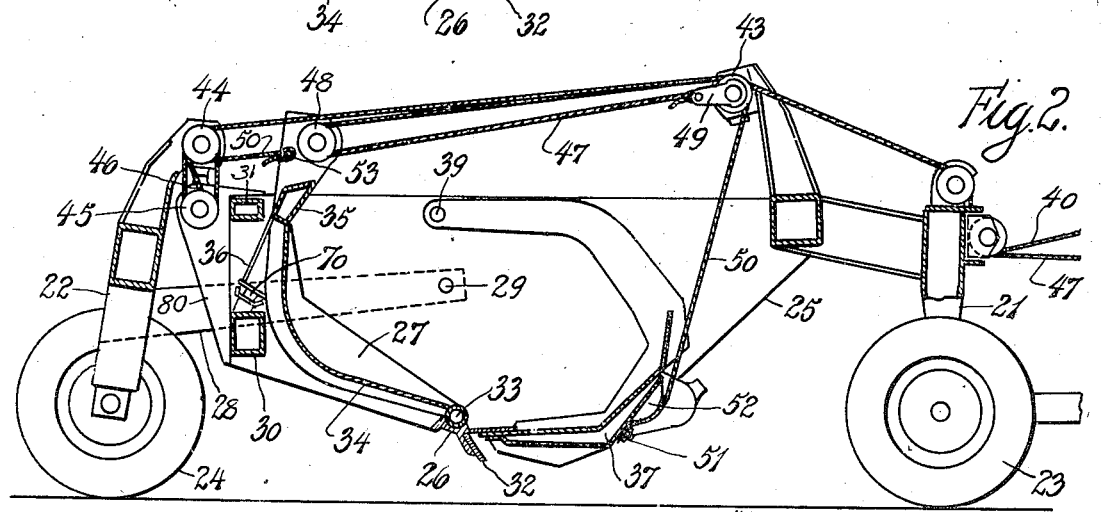
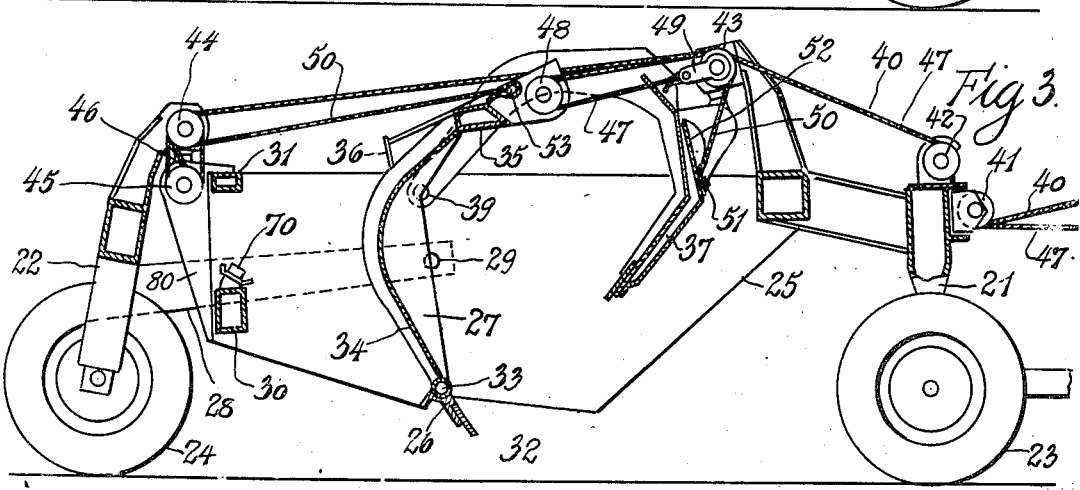

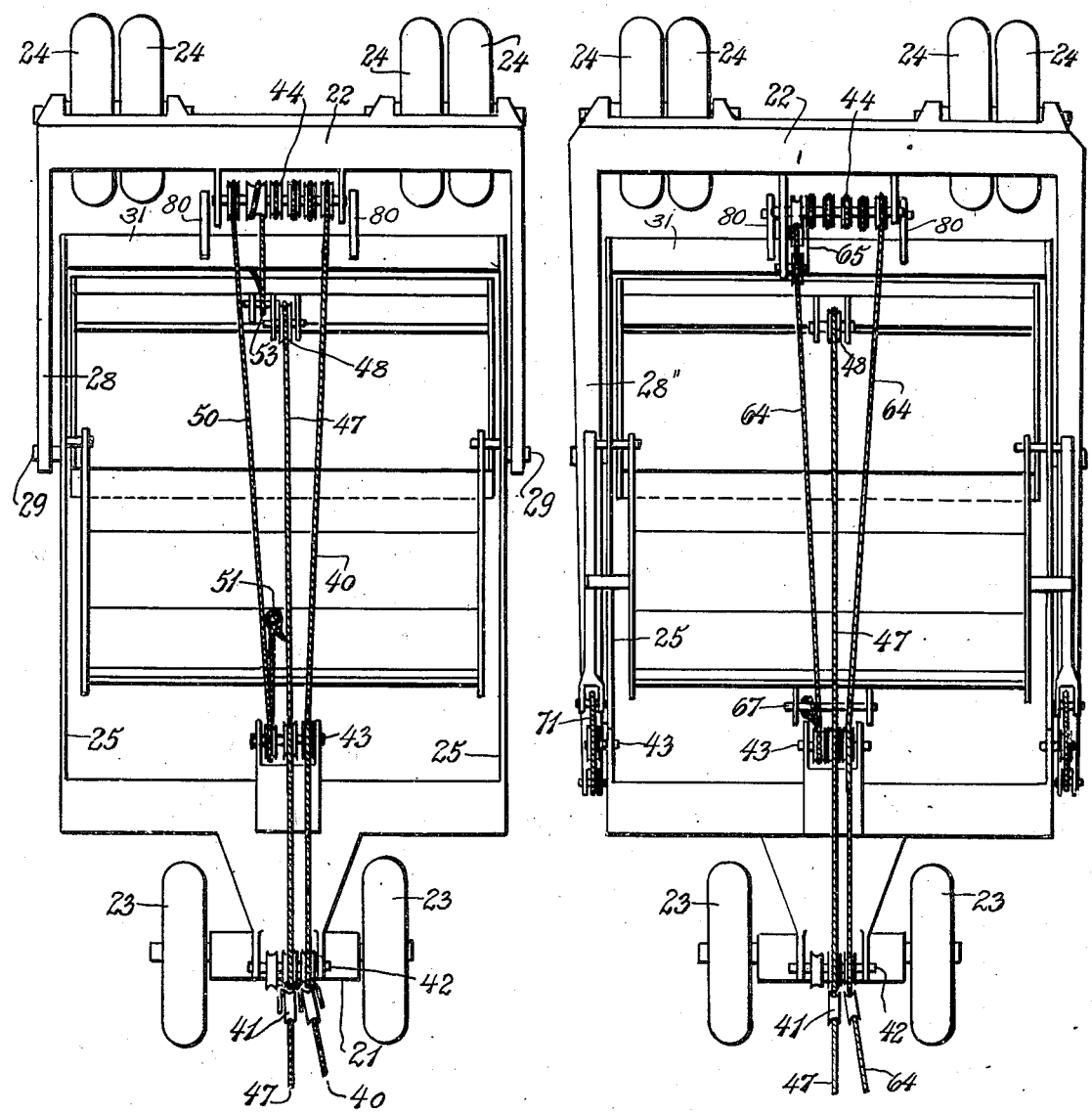

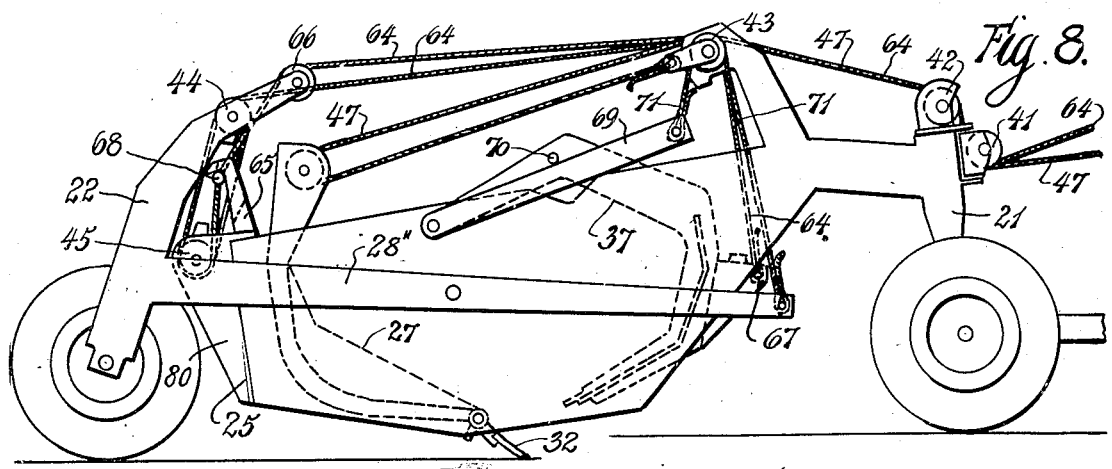
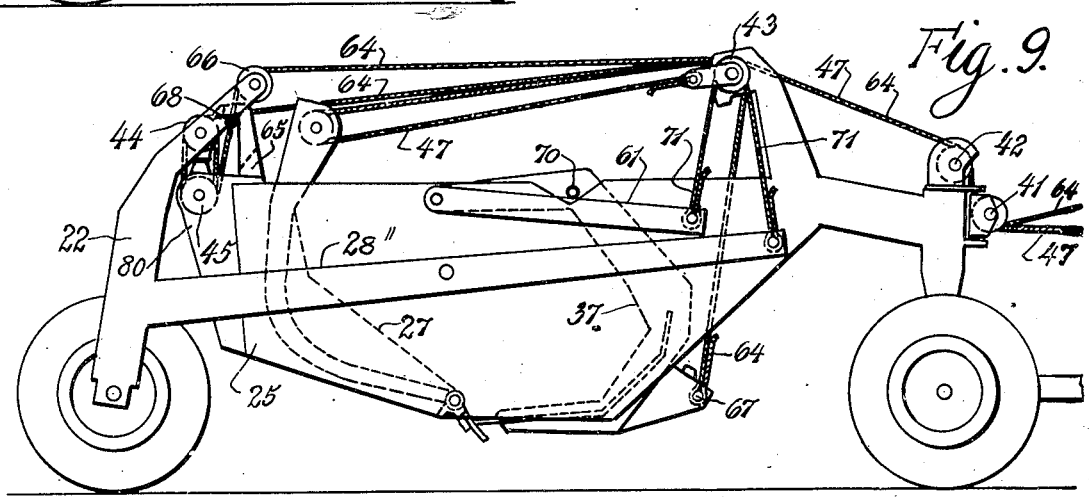
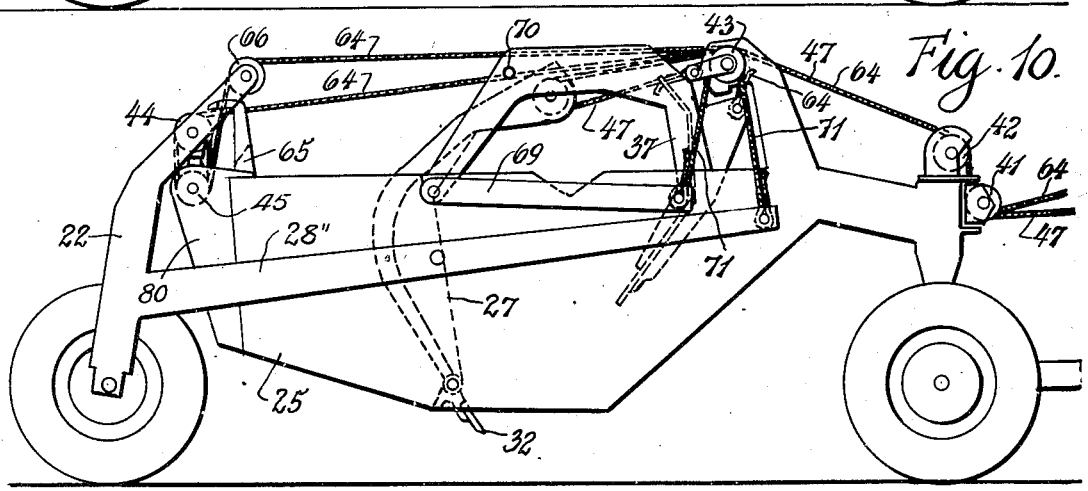

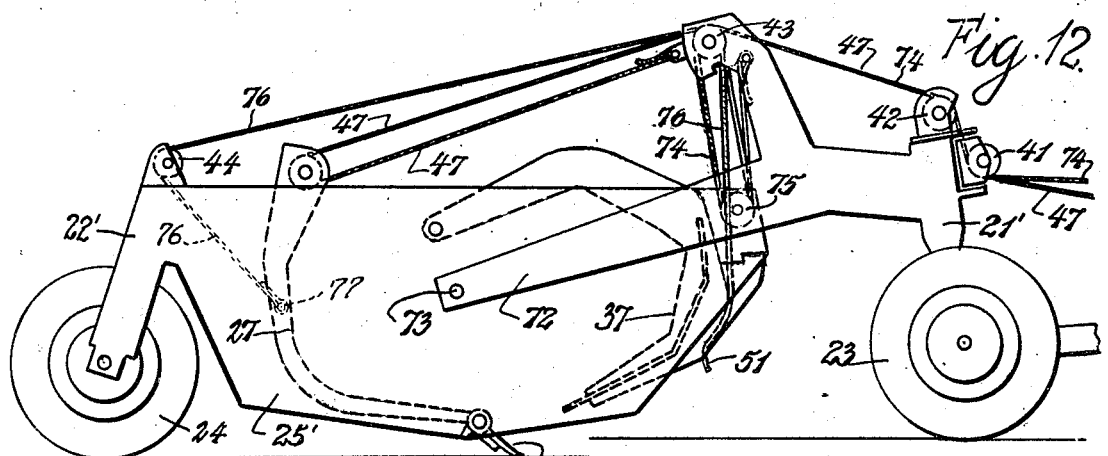

Patented Oct. 23, 1945

2,387,263

UNITED STATES PATENT OFFICE 2,387,263

WHEELED SCRAPER

Roger Sherman Hoar, South Milwaukee, Wis., assignor to Bucyrus-Erie Company, South Milwaukee, Wis., a corporation of Delaware Application July 11, 1941, Serial No. 401,939

6 Claims. (Cl. 37—126)

My invention relates to new and useful improvements in wheeled scrapers of the general type shown and described in U. S. Patent No. 2,152,899, granted April 4, 1939, to Earl B. Maloon, to which patent reference is hereby made, inasmuch as this present invention represents an improvement thereon.

In scrapers of that type, the bowl fills and dumps at its front end.

The main frame of such a scraper is pivoted at either its front end or rear end to a wheeled truck, and the digging and spreading depth is determined by raising or lowering the other end with respect to a second truck. This is the first operating function.

In Maloon and in all but one of the variants of this present invention, the pivoting is at the front end, and the raising and lowering takes place at the rear end; but this, although very advantageous, is not essential—witness the variant of Figures 12, 13 and 14 hereof.

The digging blade is carried rigid with the main frame, though this is not essential.

Adjacent the digging blade is pivoted a dirt-extruding curved member, variously termed. For conformity with the nomenclature of the Maloon patent, it will here be called a "bowl." Swinging this bowl upward to dump is the second function.

Returning it to load-carrying position is the third function.

There is also a front closure, known as the "apron." Opening this apron (when digging or dumping), and closing it again for carrying, is the fourth function.

Maloon has two controls (ropes), one of which performs the first function (namely depth-control), and the other of which successively performs the fourth function (apron opening) and the second function (dumping). For the third function (bowl return), Maloon depends on gravity, although in another patent (No. 2,198,916, granted April 30, 1940), he performs this function by a kick-back cam, actuated by the fall of the apron.

It is the principal object of my present invention to employ two controls, one of which performs the first function (depth control), and the other of which performs the second function (dumping), and to provide an interlock between bowl, main frame and apron, whereby either the forward motion of the bowl to dump, or the lowering of the digging edge, will perform the fourth function (apron opening).

A further object of my present invention is to utilize this same interlock to perform the third function (bowl return), thus constituting an improvement over the apparently somewhat similar bowl return means of the co-pending application of Trevor O. Davidson and myself, filed November 9, 1940, Serial No. 364,980 and since issued as Patent No. 2,304,076.

In addition to my principal objects, above stated, I have worked out a number of novel and useful details, which will be readily evident as the description progresses.

My invention consists in the novel parts and in the combination and arrangement thereof, which are defined in the appended claims, and of which five embodiments are exemplified in the accompanying drawings, which are hereinafter particularly described and explained.

Throughout the description, the same reference number is applied to the same member or to similar members.

Figures 1, 2 and 3 are vertical longitudinal sections of one form of my scraper, in digging, carrying, and dumping positions respectively.

Figure 4 is a plan view of this variant.

Figure 5 is a side elevation of the variant of the preceding figures, in carrying position, but for simplicity with the omission of all ropes and sheaves not involved in the interlock which controls the opening.

Figures 6 and 7 are respectively side elevations of two further variants of my invention, in carrying position, but for simplicity with the omission of all ropes and sheaves not involved in the interlock which controls the apron opening.

Figures 8, 9 and 10 are side elevations of a fourth form of my scraper, in digging, carrying, and dumping positions respectively. Incidentally a fifth variant is shown therein.

Figure 11 is a plan view of this variant.

Figures 12, 13 and 14 are side elevations of a sixth form of my scraper, in digging, carrying, and dumping positions respectively.

Referring now to Figures 1 to 5, we see that the implement to which I have applied my invention, includes a forward truck 21, and a rear truck 22, supported respectively on two forward wheels 23, and four rear wheels 24. The forward truck 21 is rigidly secured to two side plates 25, preferably having substantially the outline indicated in Figures 1 to 4. Rigidly secured to the side plates 25, I provide a transverse lower beam 30, and an upper beam 31, which latter beam may if desired be made of lighter construction than the lower beam. Projecting rearwardly from beams 30 and 31 are sheave-supporting brackets 80.

These parts constitute parts of the frame of the implement, and in accordance with the invention they are connected together in such a way as to enable the shoe 26, which is located forward of the bowl 27, to be raised or lowered at will with respect to the ground level. In order to accomplish this, the rear truck 22 is preferably provided with rigid forwardly projecting side arms 28 that extend forwardly to a point about midway between the two trucks, at which point the arms 28 are connected by pivot pins 29 to the side plates 25.

The shoe 26 is preferably rigidly secured at its ends to the side plates 25, and preferably includes an inclined blade 32 that cuts into the earth when the bowl 27 is being filled. Adjacent the shoe and preferably at its rear edge, the bowl 27 is pivotally mounted on a transverse pivot bar 33.

The rear end of the bottom plate 34 of the bowl 27 is preferably bent upwardly to form an integral dished rear head 35 for the bowl.

When the bowl 27 is in the position of rest as indicated in Figures 1 and 2, the stop bracket 36, carried by the rear end of the bowl, rests against a bumper block 70 on the upper side of the lower beam 30, and this limits the downward movement of the rear end of the bowl.

To catch some of the dirt during digging, to hold the dirt in the bowl 27 and between the side plates 25 during carrying, and to assist in the discharge of the dirt during dumping, I employ an apron 37, pivotally supported on plates 25 by pivot pins 39.

In this particular variant of my invention, I employ two control ropes, the reeving of which will now be described, still with reference to Figures 1 to 4.

Rope 40 controls the first listed function, namely depth-control. It passes, from a winch (not shown, preferably mounted on the tractor which pulls my scraper), under one of fairlead sheaves 41, over one of fairlead sheaves 42, over one of sheaves 43, and several times around sheaves 44 on the rear truck 22, and sheaves 45 on the brackets 80. Thence it passes to an anchorage 46 adjacent either sheaves 44 or sheaves 45; as shown, it is adjacent the latter. Drawing-in on this rope 40 draws sheaves 44 and 45 together, as shown in Figures 2 and 3, thus raising the digging blade 32.

Rope 47 controls the second listed function, namely dumping. It passes, from the winch (not shown), under one of fairlead sheaves 41, over one of fairlead sheaves 42, over one of sheaves 43, around sheave 48 on the top of the bowl 27, and back to an anchorage 49 adjacent sheaves 43. Drawing-in on this rope 47 draws sheaves 43 and 48 together, thus tilting the bowl 27 from its carrying position as shown in Figures 1 and 2, to its dumping position as shown in Figure 3.

Rope 50 controls the fourth listed function, namely apron opening. It passes, from an anchorage 51 on the apron 37, over a grooved direction-changing cam 52 on said apron, thence over one of the sheaves 43, thence around one of sheaves 44, one of sheaves 45, and one of sheaves 44, to an anchorage 53 on the rear top of the bowl 27. The result of this reeving is that whenever the digging blade 32 is lowered (thus widening the gap between sheaves 44 and 45), or whenever the bowl 27 is tilted forward to dump (thus widening the gap between sheaves 44 and anchorage 53), the tension thus imparted to rope 50 will raise the apron 37, a small amount as shown in Figure 1 in the first instance, and a greater amount as shown in Figure 3 in the second instance.

A by-product of this rope 50 is that the weight of the main frame, acting through the reaches which lie between sheaves 44 and sheaves 45, will cause the tension in the reach which extends from sheaves 44 to anchorage 53, to tend to return the bowl to its dirt-receiving position after dumping. In this respect it acts somewhat similarly to the dead-ended reach of rope 40 in the already mentioned copending application of Trevor O. Davidson and myself.

Having now completed the discussion of the variant of my invention exemplified by Figures 1 to 5 hereof, let us proceed to discuss the two variants of Figures 6 and 7 respectively. In these two variants, all elements not hereinafter mentioned as different, are identical to the corresponding elements of my already-described variant, and so need not again be discussed. Ropes 40 and 47 and their associated sheaves are (as in Figure 5) omitted from Figures 6 and 7, for the sake of clarity in showing the reeving of the interlock rope.

In the device of Figure 6, rope 54 takes the place of, and performs the functions of, rope 50 of my first variant. Arms 28, now renumbered as 28', are extended forward, and each carries a sheave 55. Rope 54 passes, from an anchorage 56 adjacent sheaves 43, around sheave 55, thence around one of sheaves 43, thence around a sheave 57 on the apron 37, thence around another of sheaves 43, thence around a sheave 58 mounted on brackets 80, and thence to anchorage 53 on bowl 27.

In the device of Figure 7, rope 59 takes the place of and performs the functions of rope 50 of my first variant. Each arm of apron 37, now renumbered as 37', extends rearwardly, and carries a sheave 60. Rope 59 passes, from an anchorage 61 on rear truck 22, around one of sheaves 62 on the bottom rear of one of side plates 25, thence around sheave 60, thence around another of sheaves 62, thence around sheave 63 on the top rear of side plate 25, and thence to anchorage 53 on bowl 27.

Let us now consider the fourth variant of my invention, namely, the device of Figures 8 to 11.

All prior described variants have involved the following principle: One rope has controlled the raising and lowering of the digging edge; another rope has controlled the dumping; and an interlocking rope has been provided, to raise the apron whenever either the digging edge is lowered or the dumping is effected.

But in this present variant, although (as in the other variants) one rope controls the raising and lowering of the digging edge, and another rope controls the dumping, and the interlock raises the apron whenever the digging edge is lowered; yet (here being the difference) the other opening of the apron is effected, not by the dumping, but rather by further pull on the digging-edge-raising rope after the digging edge has been raised to its full extent.

In this present variant, all elements not hereinafter mentioned as different, are identical to the corresponding elements of my first-described variant, and so need not again be discussed.

In this present variant, rope 64 takes the place of rope 40. Its primary function is to effect depth-control, but (as already stated above) it has in this variant the further function of effecting apron-opening. It passes, from a winch (not shown, preferably mounted on the tractor which pulls my scraper), under one of the fairlead sheaves 41, over one of fairlead sheaves 42, over one of sheaves 43, and several times around sheaves 44 on the rear truck 22, and sheaves 45 on brackets 80. Thence it passes through hook 65 on brackets 80, and thence over sheave 66 on the rear truck 22, thence over one of sheaves 43, and thence to an anchorage 67 on apron 37. On rope 64, abutting hook 65, is a stop 68.

Paying out rope 64 from its winch permits the side-plates 25, and hence the blade 32 to lower for digging, as shown in Figure 8. As this lowering takes place, hook 65 pulls on stop 68, thus pulling on the reach of rope 64 which extends from this stop to the apron 37, thus raising the apron.

Pulling in on rope 64 raises side plates 25 to carrying position, as shown in Figure 9. The consequent rise of hook 65 permits stop 68 to rise, thus permitting apron 37 to fall and close.

Still further pulling in of rope 64, after plates 25 are in their fully raised position, causes apron 37 to open again for dumping, as shown in Figure 10.

I have also shown in Figures 8 to 11 an alternative interlock, to take the place of hook 65 and stop 68. If this substitution be made, we shall have a fifth variant. Or, if desired, both forms of interlock can be used simultaneously, to reinforce each other, as shown. Rope 64 will effect apron opening for dumping, in identically the manner described above and shown in Figure 10. But apron opening for digging will be effected as follows: Arms 28, now renumbered 28″, are extended forward. Also we provide auxiliary arms 69, pivoted coaxially with apron 37, which carries stops 70, engageable with said auxiliary arms. Rope 71 passes from an anchorage on one of arms 28″, over one of sheaves 43, to an anchorage on one of arms 69, and thus serves to raise the apron 37, as shown in Figure 8, whenever arms 28″ swing down coincident with lowering the digging edge 32.

Let us now consider the sixth variant of my invention, namely, the device of Figures 12 to 14.

This present variant is similar to my first variant, namely, that of Figures 1 to 4, except that in this present variant the main bowl pivots about the rear wheels rather than about the front wheels.

Side plates 25′ are built integral with rear truck 22′. Arms 72 extend rearwardly from front truck 21′, to pivots 73 on the side plates.

Rope 74 performs the functions of rope 40 of the first variant. It passes, from a winch (not shown, preferably mounted on the tractor which pulls my scraper), under one of the fairlead sheaves 41, over one of the fairlead sheaves 42, several times around sheaves 43 on the front truck 21′ and sheaves 75 at the front end of side plates 25′, to an anchorage.

Rope 76 performs the functions of rope 50 of the first variant. It passes from an anchorage 51 on the apron 37 over a grooved direction-changing cam 52 on said apron, thence over one of sheaves 43, thence around one of sheaves 75, back over one of sheaves 43, over sheave 44 to an anchorage 77 on the rear of bowl 27.

But note that anchorage 77 in Figures 12 to 14 is positioned lower than anchorage 53 in Figures 1 to 3. This lower positioning enables rope 76 to perform the additional function of initiating the dumping action of bowl 27.

Rope 47 and its associated sheaves and anchorages, remains unchanged.

Having now described and illustrated six forms of my invention, I wish it to be understood that my invention is not to be limited to the specific form or arrangement of parts herein described and shown.

I claim:

1. In a scraper, having: ground support; a main frame, supported thereby in such manner as to be raisable and lowerable with respect to the ground; a digging blade, carried by the main frame; a dumping and dirt-holding bowl, pivoted to the main frame adjacent the blade; a front apron, pivotally supported by the main frame, and adapted, when lowered, to retain dirt within the bowl; and means to raise the main frame and thereby the blade; the combination therewith of: interlocking rope means, operatively connecting the apron to the main frame, to one of the ground supports, and to the bowl, in such a way that whenever either the main frame is lowered, or the bowl is moved to dump, this motion will raise the apron; and that a reach of this rope extends rearwardly from the bowl to some other portion of the scraper with respect to which other part the bowl is relatively movable during dumping, thus tending to initiate the return of the bowl from dumping position to dirt-holding position, this reach being applied to the bowl at such a point and at such an angle as to have a tendency, when the bowl is in dirt-holding position, to assist rather than oppose the dumping means.

2. In a scraper, having: a front ground support; a rear ground support; a main frame pivotally supported by the front ground support in such manner as to be raisable and lowerable with respect to the ground; a digging blade carried by the main frame; a dumping and dirt-holding element, pivoted to the main frame; a front apron, pivotally supported by the main frame, and adapted, when lowered, to retain dirt within the dirt-holding element; a first rope, operatively connecting the rear support to the main frame, to raise the main frame and thereby the blade; a second rope, operatively connecting the main frame and the dumping element, to move this element to dump; and an interlocking rope, operatively connecting the apron, the main frame, the rear support, and the dumping element, in such a way that the lengthening of a reach of this interlocking rope between the main frame and the rear support will raise the apron, and that the lengthening of a reach of this interlocking rope between the dumping element and one of the other elements will raise the apron.

3. In a scraper, having: a front ground support; a rear ground support; a main frame pivotally supported by the front ground support in such manner as to be raisable and lowerable with respect to the ground; a digging blade carried by the main frame; a dumping and dirt-holding element, pivoted to the main frame; a front apron, pivotally supported by the main frame, and adapted, when lowered, to retain dirt within the dirt-holding element; a first rope, operatively connecting the rear support to the main frame, to raise the main frame and thereby the blade; a second rope, operatively connecting the main frame and the dumping element, to move this element to dump; and an interlocking rope, operatively connecting the apron, the main frame, and the rear support, in such a way that the lengthening of a reach of this interlocking rope between the main frame and the rear support will raise the apron.

4. In a scraper, having: a front ground support; a rear ground support; a main frame pivotally supported by the front ground support in such manner as to be raisable and lowerable with respect to the ground; a digging blade carried by the main frame; a dumping and dirt-holding element, pivoted to the main frame; a front apron, pivotally supported by the main frame, and adapted, when lowered, to retain dirt within the dirt-holding element; a first rope, operatively connecting the rear support, the main frame, and the apron, in such a way that drawing-in of this rope will raise the main frame, and that paying out this rope will permit gravity to lower the main frame, and that, after the main frame has been raised to its utmost, further drawing-in on this rope will raise the apron; a second rope, operatively connecting the main frame and the dumping element, to move this element to dump; and an interlocking rope, operatively connecting the apron, the main frame, and the rear support, in such a way that the lengthening of a reach of this interlocking rope between the main frame and the rear support will raise the apron.

5. In a scraper, having: a front ground support; a rear ground support; a main frame pivotally supported by the front ground support in such manner as to be raisable and lowerable with respect to the ground; a digging blade carried by the main frame; a dumping and dirt-holding element, pivoted to the main frame; a front apron, pivotally supported by the main frame, and adapted, when lowered, to retain dirt within the dirt-holding element; a first rope, operatively connecting the rear support, the main frame, and the apron, in such a way that drawing-in of this rope will raise the main frame, and that paying-out this rope will permit gravity to lower the main frame, and that, after the main frame has been raised to its utmost, further drawing-in on this rope will raise the apron; a second rope, operatively connecting the main frame and the dumping element, to move this element to dump; and an interlocking means, operatively connecting the apron, the main frame, and the rear support, in such a way that the lowering of the main frame will raise the apron.

6. In a scraper, having: a front ground support; a rear ground support; a main frame pivotally supported by the front ground support in such manner as to be raisable and lowerable with respect to the ground; a digging blade carried by the main frame; a dumping and dirt-holding element, pivoted to the main frame; a front apron, pivotally supported by the main frame, and adapted, when lowered, to retain dirt within the dirt-holding element; a first rope, operatively connecting the rear support to the main frame, to raise the main frame and thereby the blade; a second rope, operatively connecting the main frame and the dumping element, to move this element to dump; an interlocking rope, operatively connecting the apron, the main frame, the rear support, and the dumping element, in such a way that the lengthening of a reach of this interlocking rope between the main frame and the rear support will raise the apron, and that the lengthening of a reach of this interlocking rope between the dumping element and one of the other elements will raise the apron.

ROGER SHERMAN HOAR.